US012709468B2

(12) United States Patent
Reeb et al.

(10) Patent No.: US 12,709,468 B2
(45) Date of Patent: *Aug. 18, 2026

(54) LOCKING DEVICE AND METHODS

(71) Applicant: Serio-Us Industries, Inc., Baltimore, MD (US)

(72) Inventors: David L. Reeb, Sykesville, MD (US); James L. Martin, II, Gambrills, MD (US)

(73) Assignee: Serio-Us Industries, Inc., Baltimore, MD (US)

(*) Notice: Subject to any disclaimer, the term of this patent is extended or adjusted under 35 U.S.C. 154(b) by 30 days.

This patent is subject to a terminal disclaimer.

(21) Appl. No.: 18/944,247

(22) Filed: Nov. 12, 2024

(65) Prior Publication Data

US 2025/0066117 A1 Feb. 27, 2025

Related U.S. Application Data

(63) Continuation of application No. 17/686,171, filed on Mar. 3, 2022, now Pat. No. 12,139,327.

(60) Provisional application No. 63/156,638, filed on Mar. 4, 2021.

(51) Int. Cl.
*B65F 1/16* (2006.01)

(52) U.S. Cl.
CPC .......... *B65F 1/1615* (2013.01); *B65F 1/1646* (2013.01); *B65F 2210/148* (2013.01)

(58) Field of Classification Search
CPC .................. B65F 1/1615; B65F 1/1646; B65F 2210/148; E05B 77/06
USPC .......................................... 220/315; 292/130
See application file for complete search history.

(56) References Cited

U.S. PATENT DOCUMENTS 3,960,289 A * 6/1976 Panicci ..................... B65F 7/00 220/756
5,094,358 A * 3/1992 Serio, Sr. ............ E05B 15/0093 292/205
5,474,341 A * 12/1995 Putman ................. B65F 1/1615 414/407
5,683,126 A * 11/1997 De Vivo ............... B65F 1/1615 292/210
D789,770 S 6/2017 Reeb et al.
9,963,276 B1 * 5/2018 Arthurs ............... E05B 63/0069
2009/0066092 A1 * 3/2009 Reeb ..................... B65F 1/1615 292/184
2010/0102575 A1 * 4/2010 Ferkovich ............. B65F 1/1615 292/259 R
2015/0314957 A1 * 11/2015 Reeb ....................... E05B 65/06 220/315

(Continued)

*Primary Examiner* — Nathan Cumar
(74) *Attorney, Agent, or Firm* — CALDERON SAFRAN & WRIGHT P.C.

(57) ABSTRACT

The present invention provides a locking device for containers, such as waste containers. The locking device comprises a rolling member. When the locking device is in its upright position, the rolling member blocks the locking device from being able to rotate to an open position. When the locking device is tilted, the rolling member rolls to its release position which allows the locking device to rotate to the open position. The locking device also include a manual release mechanism for a user to manually place the rolling member into the release position, so that he/she can manually open the locking device when it is in the upright position.

20 Claims, 13 Drawing Sheets

(56) References Cited

U.S. PATENT DOCUMENTS

| | | | | |
|---|---|---|---|---|
| 2016/0159570 | A1* | 6/2016 | Reeb | E05B 17/2034 292/197 |
| 2017/0190509 | A1* | 7/2017 | Reeb | B65F 1/1615 |
| 2017/0197787 | A1* | 7/2017 | Reeb | E05C 21/00 |
| 2017/0320665 | A1* | 11/2017 | Reeb | B65F 1/1646 |
| 2017/0320666 | A1* | 11/2017 | Reeb | B65F 1/1615 |

* cited by examiner

LOCKING DEVICE AND METHODS

CROSS-REFERENCE TO RELATED APPLICATIONS AND CLAIM TO PRIORITY

This application is a continuation of U.S. patent application Ser. No. 17/686,171 filed Mar. 3, 2022, now U.S. Pat. No. 12,139,327, which claims the priority of U.S. Provisional Application No. 63/156,638 filed Mar. 4, 2021, of which are incorporated herein by reference.

FIELD OF THE INVENTION

The present invention generally relates to waste containers and, more particularly, relates to a locking device for containers, such as waste containers, and methods of using the locking devices.

BACKGROUND OF THE INVENTION

As is well known, a waste container, such as a refuse container for use in residential and industrial applications, typically includes a container supported on a base structure. With the advent of mechanized trash removal, there have been created a number of large sized trash bins or dumpster containers. These containers usually comprise a block-shaped or pyramid-shaped container with a hinged lid attached to one side thereof. The container further includes attachments for accommodating various lifting mechanisms of the trash removal vehicle. The containers are lifted by the lifting mechanism of the trash removal vehicle and pivoted in some fashion, so that the hinged top of the container opens and the trash contained therein is emptied into the vehicle. The container is then returned to a position on the ground, and the hinged lid closes on top of the container. Many of these large trash receptacles are rented from a trash removal service. These receptacles are not provided free of charge, and consequently their frequent emptying and service can become a considerable expense. This expense is increased further when unauthorized users freely deposit trash therein. This unauthorized use necessitates a more frequent emptying of the container, and of course the unauthorized user does not contribute to the increased expense.

In order to reduce the added expense that comes from unauthorized use, the dumpsters may be locked. While conventional chains and padlocks reduce unauthorized dumpster use, they also add to operating expenses because the driver of the truck emptying the dumpster must get out of the truck to unlock the padlock on the dumpster and then reverse the process after emptying. For decades, companies have been developing and marketing dumpster locking mechanisms that open automatically when the dumpster is lifted and inverted to dump the trash into the truck. With such an automatic lock, the driver is not required to leave the truck, which saves the trash company and user hundreds of dollars each year.

Conventional automatic locks are typically bulky, expensive, and may be difficult to mount to multiple containers. Because containers come in a variety of shapes and sizes, it is important that the locking device be sized and shaped to be retrofit onto a variety of existing containers. Moreover, the locking device must be able to withstand the rigors of everyday, outdoor use in the waste environment. An example of a prior art lock is disclosed in U.S. Pat. No. 5,094,358, the disclosure of which is incorporated herein by reference.

Therefore, there exists a need for an automatic locking device and method of use that improves upon prior automatic locking devices and solves problems inherent in known automatic locking devices.

SUMMARY OF THE INVENTION

An aspect of the present invention is to provide a locking device for containers, such as waste containers. The locking device comprises a rolling member. When the locking device is in its upright position, the rolling member blocks the locking device from being able to rotate to an open position. When the locking device is tilted, the rolling member rolls to its release position which allows the locking device to rotate to the open position. The locking device also include a manual release mechanism for a user to manually place the rolling member into the release position, so that he/she can manually open the locking device when it is in the upright position.

Another aspect of the present invention is to provide a container, such as a waste container, having the locking device mounted to a front wall of the container.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

DETAILED DESCRIPTION OF THE PREFERRED EMBODIMENT(S)

Figure 1:
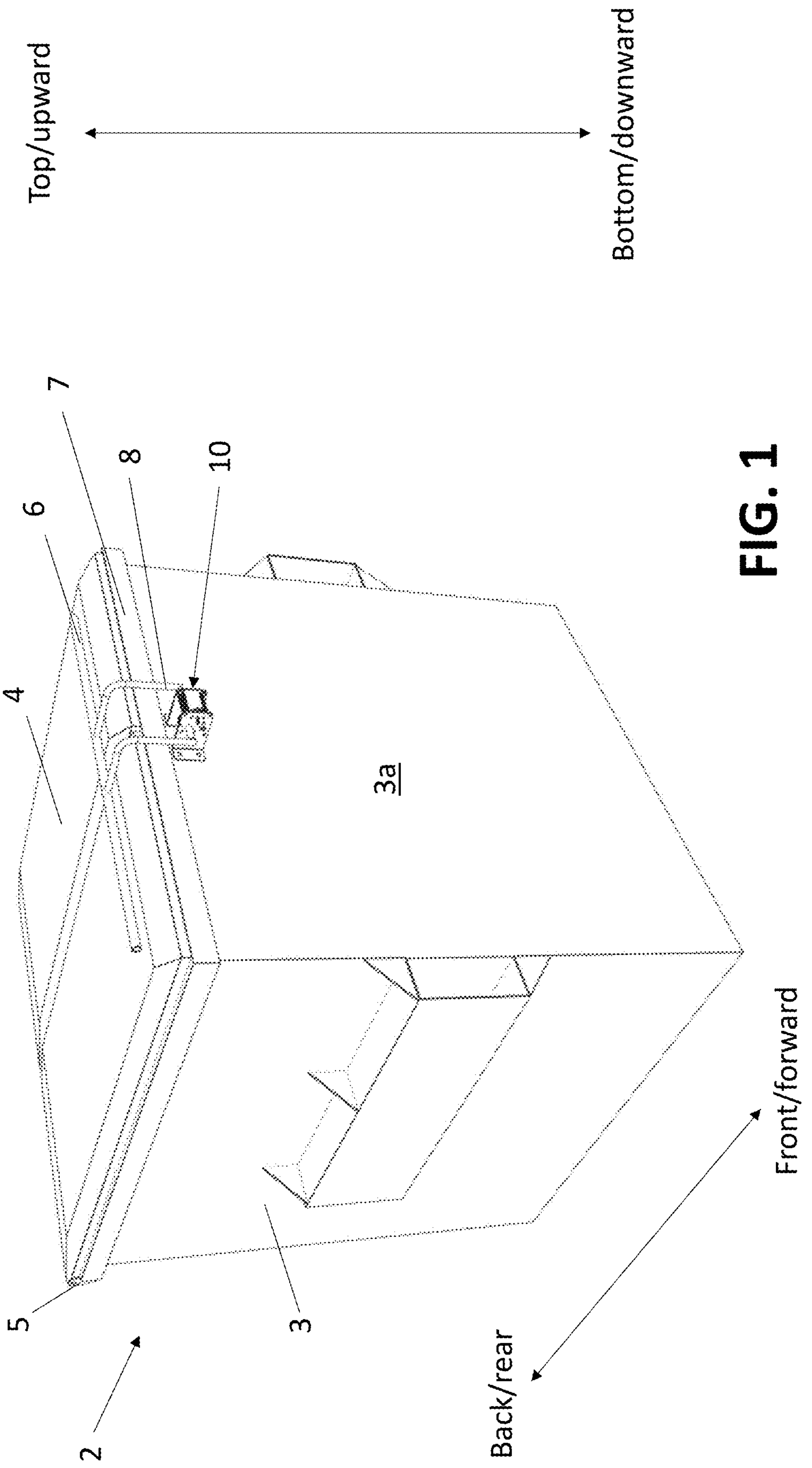
FIG. 1 is a perspective view of a closed container with the locking device in the closed position.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

Figure 3:
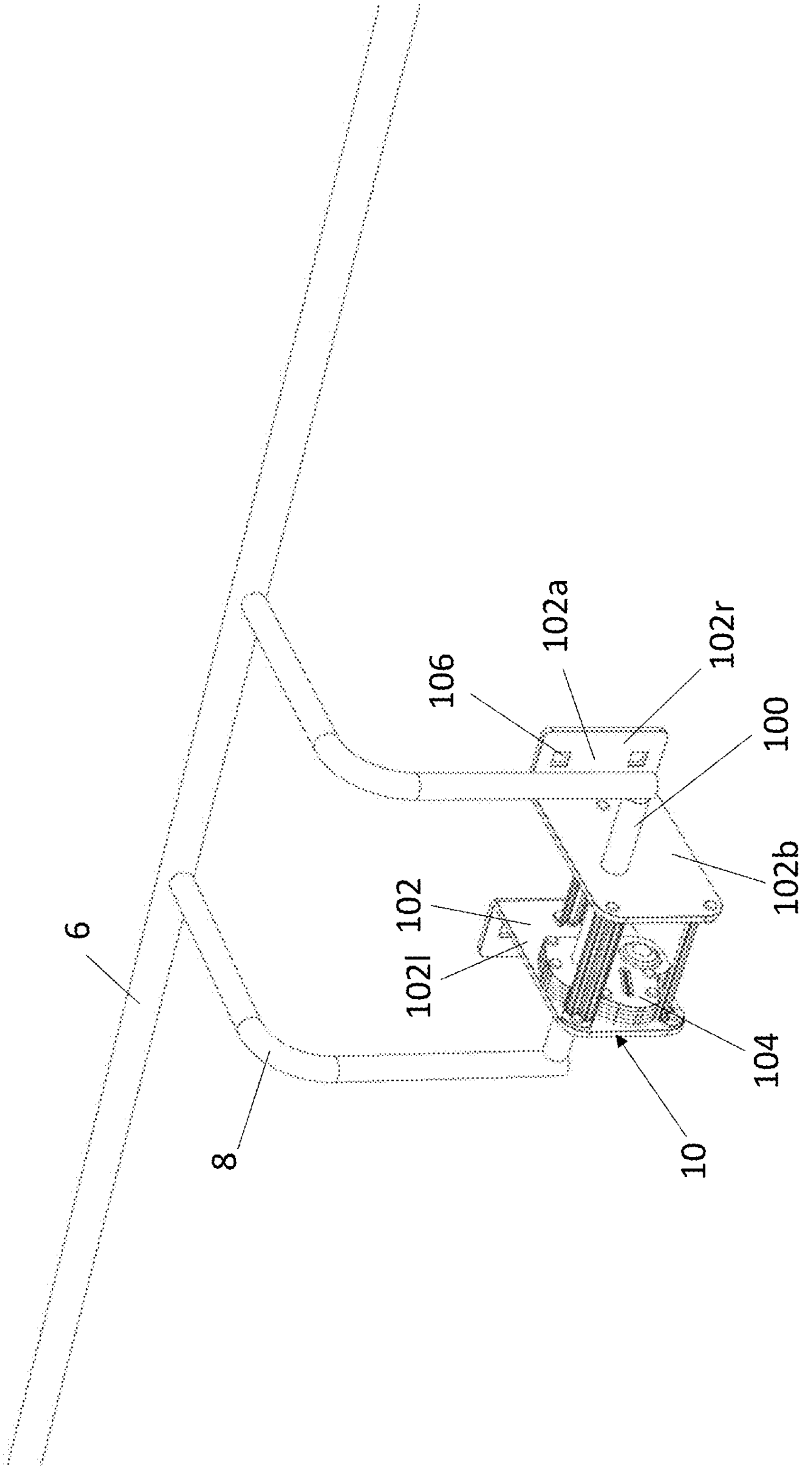
FIG. 3 is a right perspective view of the locking device attached to a locking bar.
Figure 4:
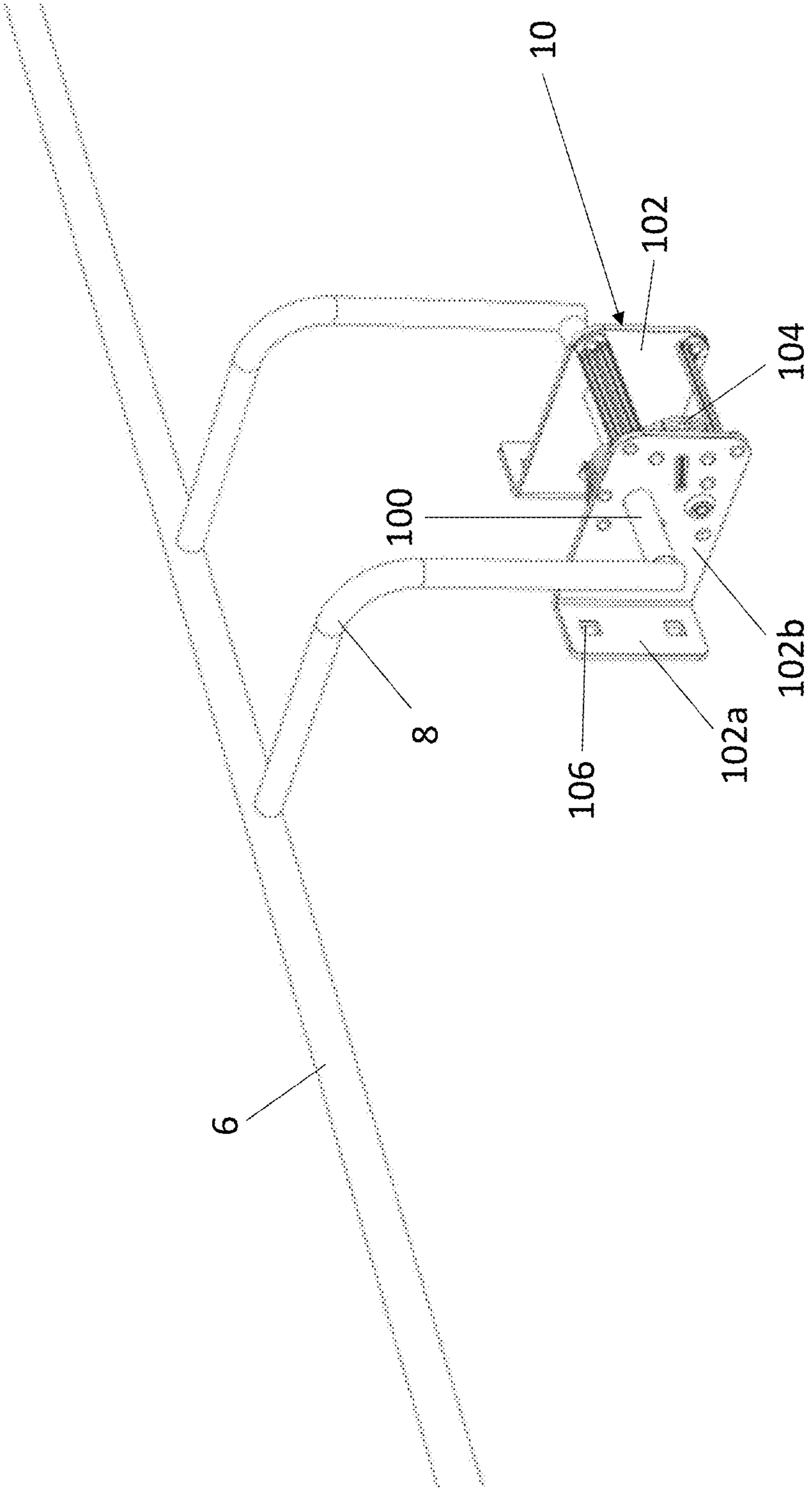
FIG. 4 is a left perspective view of the locking device attached to a locking bar.

This description of exemplary embodiments is intended to be read in connection with the accompanying drawings, which are to be considered part of the entire written description. In the description, relative terms such as "horizontal," "vertical," "up," "down," "upper", "lower", "right", "left", "top", "bottom", "forward", and "backward" as well as derivatives thereof (e.g., "horizontally," "downwardly," "upwardly," etc.) should be construed to refer to the orientation as then described or as shown in FIGS. 3 and 4. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. Additionally, the word "a" and "an" as used in the claims means "at least one" and the word "two" as used in the claims means "at least two".

Figure 2:
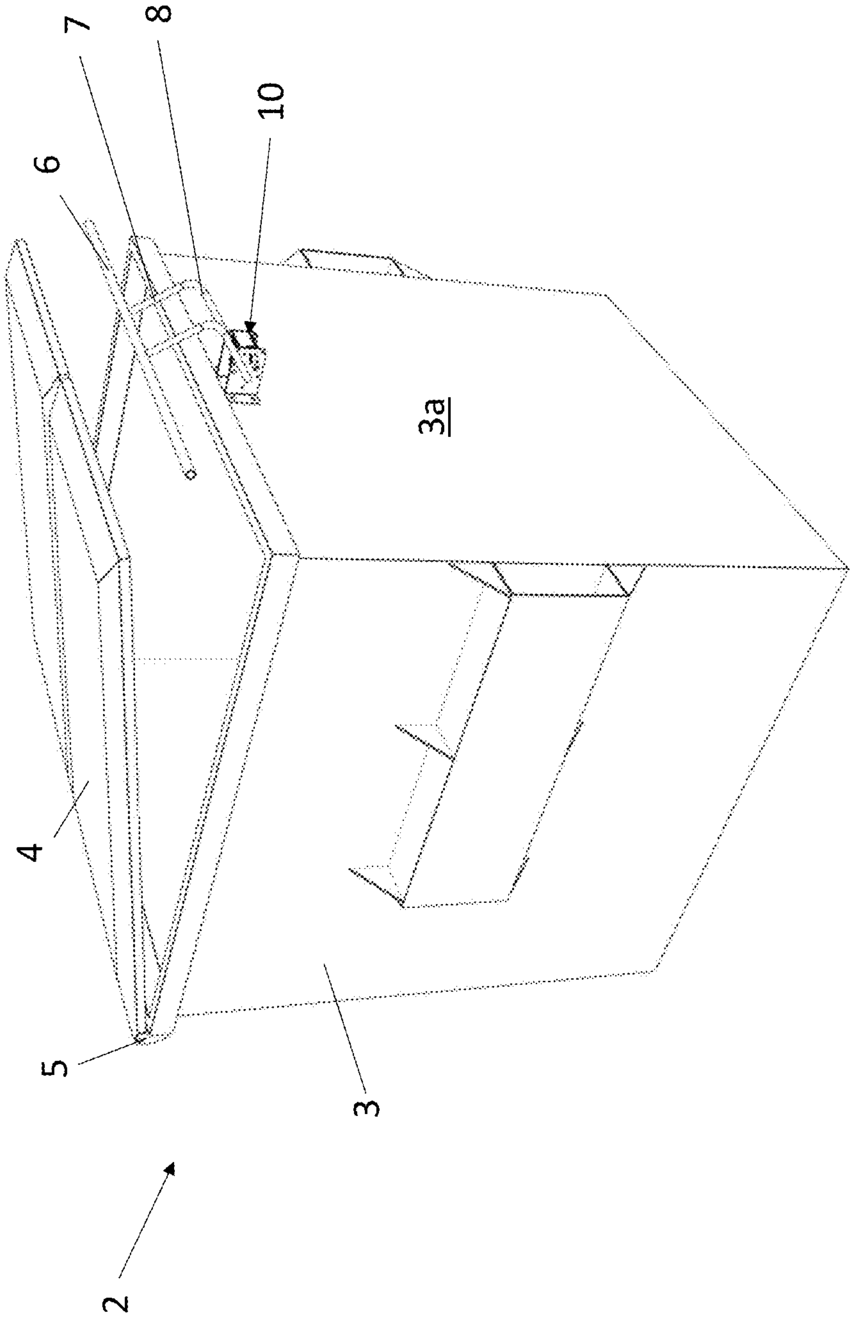
FIG. 2 is a perspective view of an opened container with the locking device in the opened position.

FIGS. 1-2 illustrates a container 2, such as a trash collector or dumpster, including a container body 3, at least one hinged lid 4 pivotally mounted thereto, a safety locking device 10, and a locking bar 6 extending across the top of the lid 4 when the container 2 is closed. The lid 4 is mounted to the container 2 by a hinge 5 and covers the top of the open container body 3. The lid 4 may be opened by lifting its front end away from the container body 3 (see FIG. 2) and toward the rear of the container body 3. The locking bar 6 is pivotable between a locked position where it lays on top of the lid 4 and blocks the lid 4 from lifting away from the container body 3 (see FIG. 1), and an open position where it is away from the lid 4 allowing the lid 4 to be lifted away from the container body 3 (see FIG. 2). The locking bar 6 may be pivoted from the locked position to the open position by lifting the bar away from and toward the front of the container 2.

The container 2, as illustrated in FIGS. 1-2, is generally an industrial-type dumpster used for retaining, storing, and eventually disposing of refuse (waste). The container 2 may be tilted or otherwise pivoted from an upright (or on-the-ground) position (wherein the waste container 2 is sitting generally horizontally on the ground) (shown in FIG. 1) to a tilted or dumping position, as known to those skilled in the art.

The locking device 10 is provided for locking and unlocking the hinged lid 4 of the container 2 to prevent unauthorized access. The locking bar 6 is connected to the locking device 10 by one or more L-shaped arms 8. Although the drawings show two arms 8, one, three, four, or more arms 8 may be used. Each arm 8 has a first end connected to the locking bar 6 and a second end connected to the locking device 10. The connection between the locking bar 6 and the arms 8 may be by mechanical fasteners, such as nuts/bolts, clamps, screws, or combinations thereof, or by welding. The locking device 10 is preferably mounted to a front wall 3*a* of the container body 3. The locking device 10 may be located anywhere on the front wall 3*a* as long as the locking bar 6 may be positioned over the lid 4 to block the opening of the container 2 (FIG. 1), and moved to be spaced from the lid 4 to allow opening of the container 2 (FIG. 2). Preferably, the locking device 10 is mounted just below a flanged lip 7 of and laterally centered on the front wall 3*a* at the front of the container 2.

Referring to FIGS. 3 and 4, the locking device 10 includes a shaft 100, mounting brackets 1021 and 102*r* (collectively 102), and a locking mechanism housed inside a housing 104. The shaft 100 is mounted to the second end of the arms 8 opposing the locking bar 6. The connection between the locking shaft 100 and the arms 8 may be by mechanical fasteners, such as nuts/bolts, clamps, screws, or combinations thereof, or by welding. The shaft 100 is preferably a rod-shaped steel bar, extending parallel to the locking bar 6 and passing through the housing 104 and the mounting brackets 102.

Figure 5:
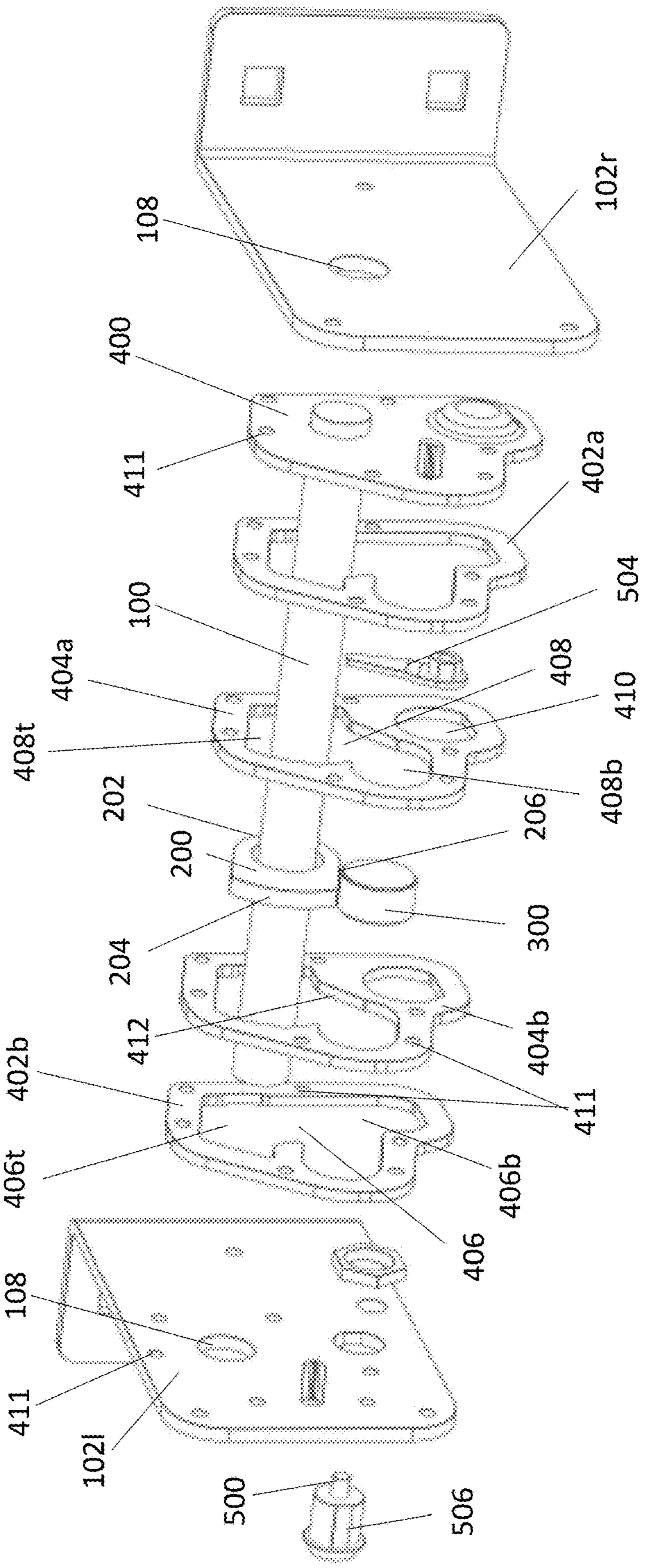
FIG. 5 is an exploded view of the locking device.

The mounting brackets 102 are spaced apart and configured to attach the locking device 10 to the front wall 3*a* of the container 2. Preferably, each of the brackets 102 is L-shaped having a first flat surface 102*a* secured to the front wall 3*a*. The first flat surface 102*a* preferably contains mounting holes 106 for attaching the locking device 10 to the front wall 3*a* through the associated bracket 102 with fasteners, such as rivets, bolts/nuts, screws, or combinations thereof. The bracket 102 also includes a second flat surface 102*b*, extending perpendicularly from the first flat surface 102*a*. Each bracket 102 includes a hole 108, as best illustrated in FIG. 5, for the shaft 100 to pass therethrough. The holes 108 are sufficiently sized to allow the shaft 100 to rotate therein about the center axis of the shaft 100. As best shown in FIG. 3, the housing 104 is attached to the left side bracket 1021, so that the left side bracket 1021 forms an outer covering for the housing 104 (see FIG. 5). Although the drawings are shown with the housing 104 being attached to the left side bracket 1021, a skilled person in the art would recognize that the housing 104 could also be mounted to the right side bracket 102*r*. Such modification is within the ability of the skilled person in the art after reading the present disclosure. Depending on the size of the locking device 10 and the container 2, the brackets 1021 and 102*r* may be from about 1 inch to about 60 inches apart, preferably about 6 to about 8 inches apart.

Figure 6:
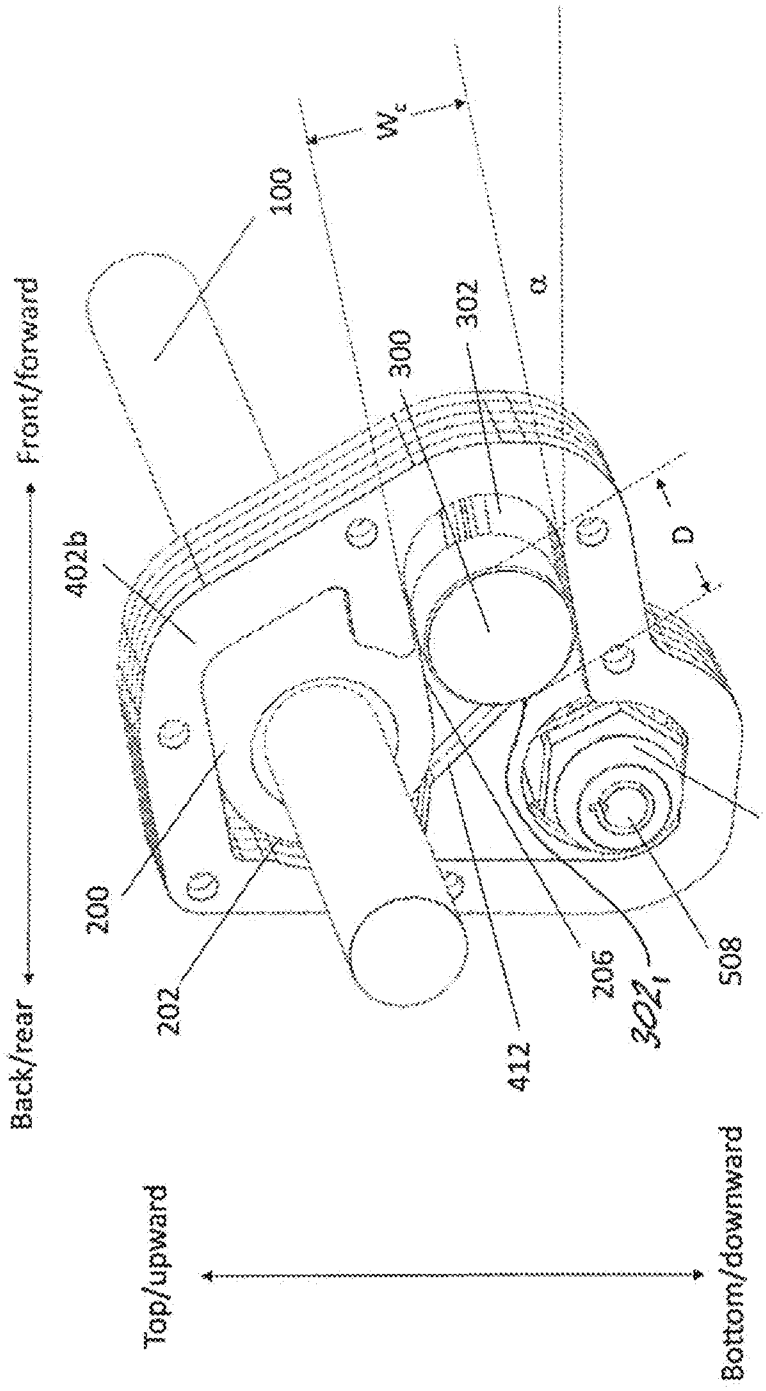
FIG. 6 is a left perspective view of the locking mechanism.
Figure 7:
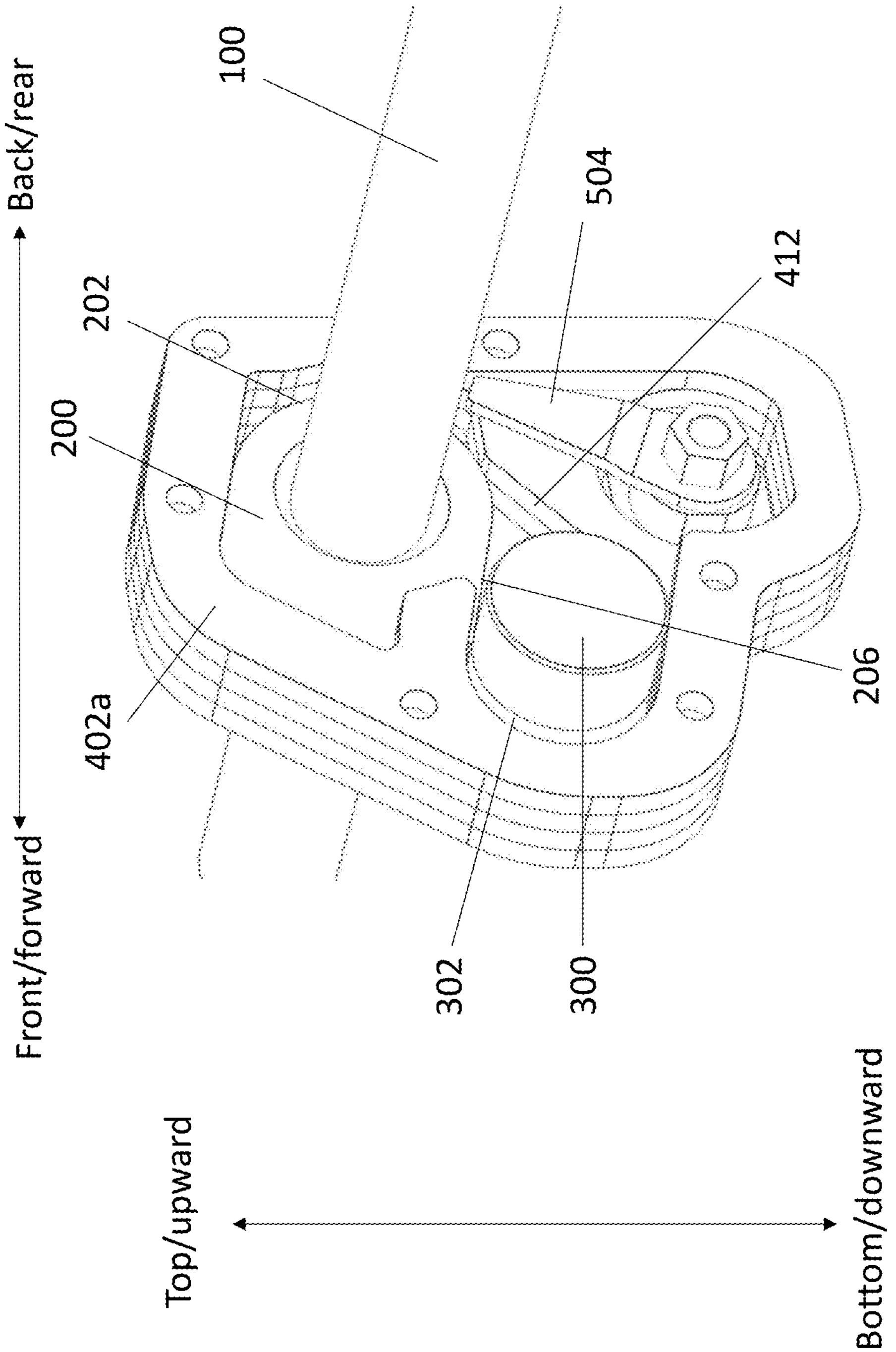
FIG. 7 is a right perspective view of the locking mechanism with the rolling member at the bottom of the cavity (outer plate removed)
Figure 8:
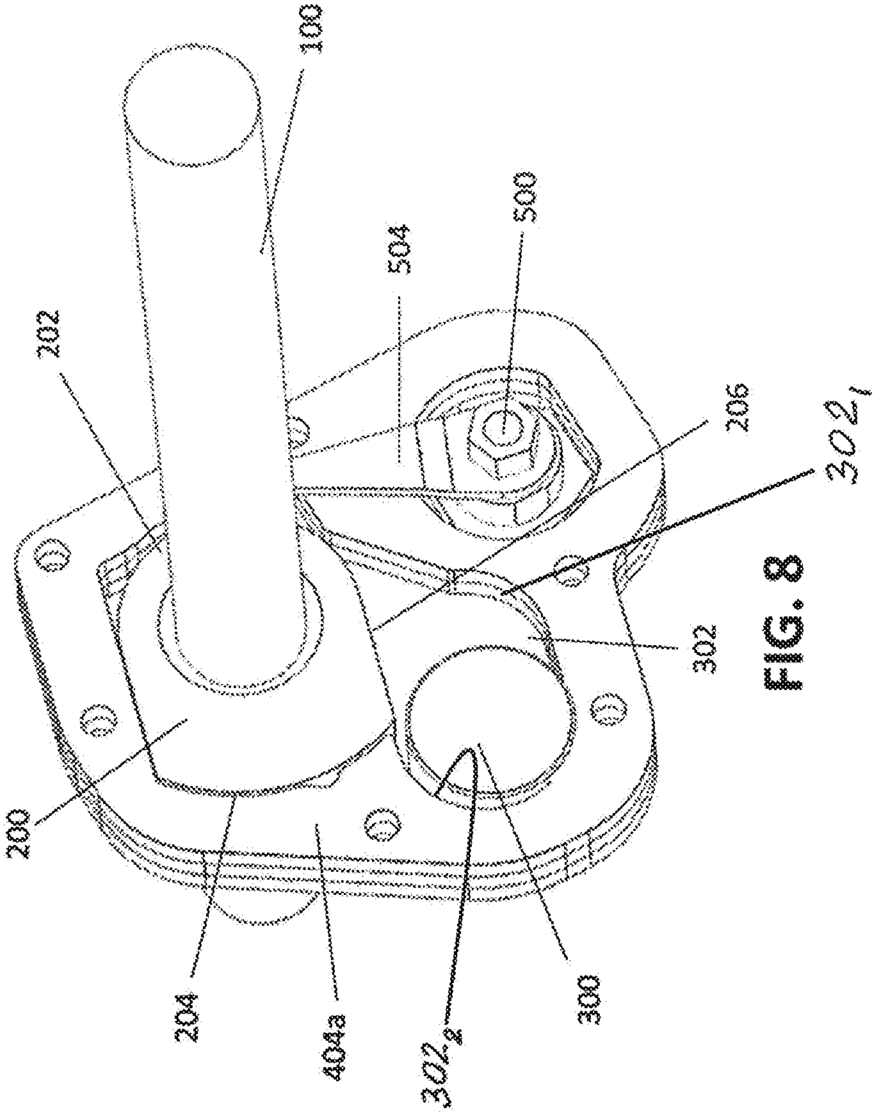
FIG. 8 is a right perspective view of the locking mechanism with the rolling member at the top of the cavity (outer and first framing plates removed)

Referring to FIGS. 5-7, the locking mechanism includes a cam 200 and a rolling member 300 contained within the housing 104. The cam 200 is formed on or fixed to the perimeter of the shaft 100, such that the cam 200 rotates with the rotation of the shaft 100. The cam 200 may, partially or entirely, encircle the shaft 100. The arms 8 and the cam 200 are fixed to the shaft 100, so that rotation of the shaft around its center axis also rotates the cam 200 and moves the arms 8 forwardly (away from the lid 4, when the locking device 10 is mounted on the container 2) or backwardly (toward the lid 4, when the locking device 10 is mounted on the container 2). Because the locking bar 6 is also fixed to the arms 8, the shaft 100, cam 200, arms 8, and looking bar 6, rotate together as a single unit. The cam 200 is preferably an elongate flat plate having one end fixed to the shaft 100 and extending perpendicularly therefrom. Preferably, the cam 200, as shown in FIGS. 6 and 8, is a flat U-shaped plate having a round end (bottom of the U) 202 and an opposing broad end 204. The shaft 100 is fixed to the cam 200 proximate the round end 202. The distance between the shaft 100 and the broad end 204 is greater than the distance between the shaft 100 and the round end 202, such that, as explained below, when the rolling member 300 is in its blocked position, a side edge 206 of the cam 200 abuts the rolling member 300 to block rotation of the cam 200 and, thereby, rotation of the shaft 100.

The rolling member 300 is contained in a cavity (or slot) 302 that is angled relative to the horizontal (see FIGS. 6-7), so that the front of the cavity 302 is higher than the rear. The cavity 302 is positioned such that the rolling member 300 is located below the cam 200 when the locking device 10 is in its upright position. The cavity 302 is preferably angled toward the front of the container 2 (when the locking device is mounted to the container 2) at an angle α (see FIG. 6) of about 10 to 60° relative to the horizontal, more preferably about 10 to about 20°. The angle α is such that, when the locking device 10 is in its upright and locked position, the rolling member 300 is pulled by gravity to a bottom (or a first end) $\mathbf{302_1}$ (see FIGS. 6 and 8) of the cavity 302 (as shown in FIGS. 6-7); and when the locking device 10 is tipped forward (tipped forward at an angle greater than α), gravity pulls the rolling member 300 to a top (or a second end) $\mathbf{302_2}$ of the cavity 302 (see FIG. 8).

Figure 9:
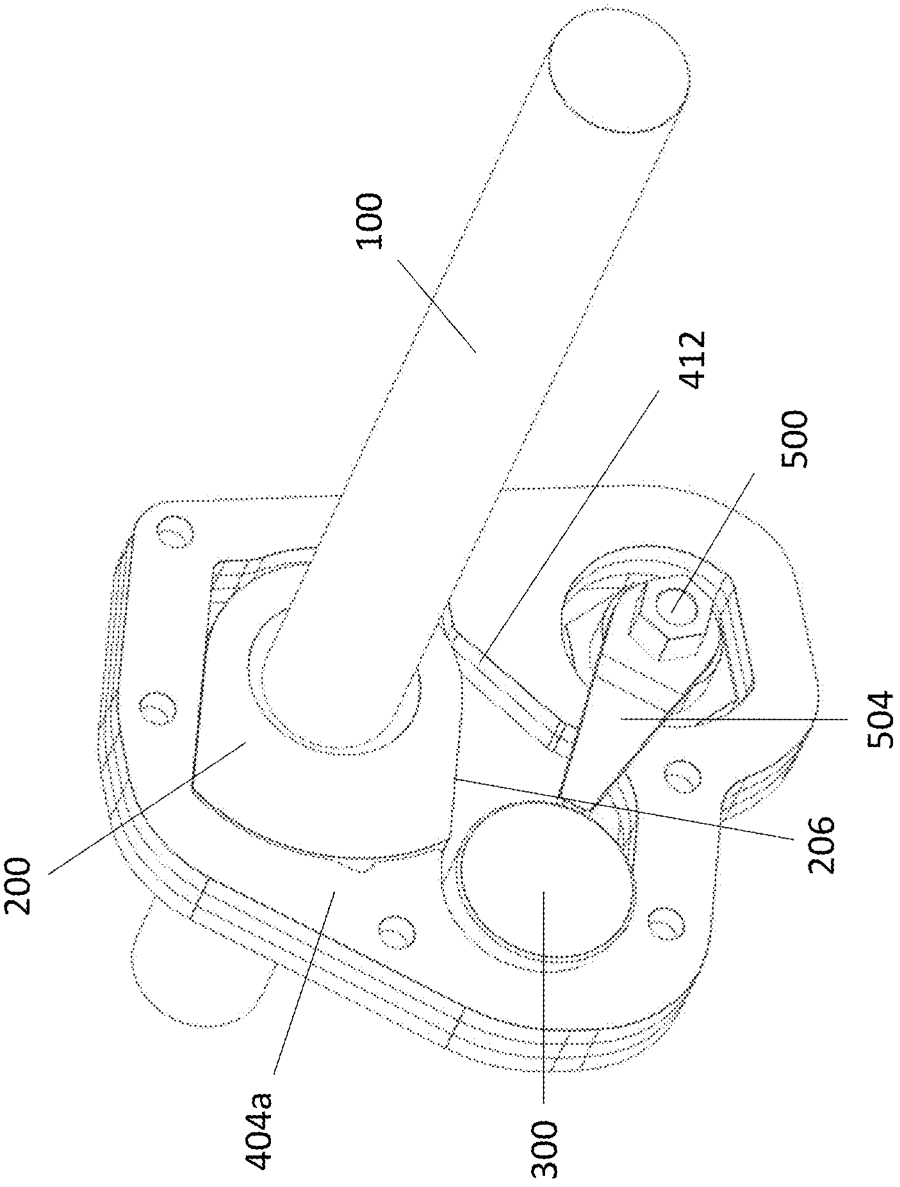
FIG. 9 is a right perspective view of the locking mechanism with the lever pushing the rolling member to the top of the cavity (outer and first framing plates removed)
Figure 10:
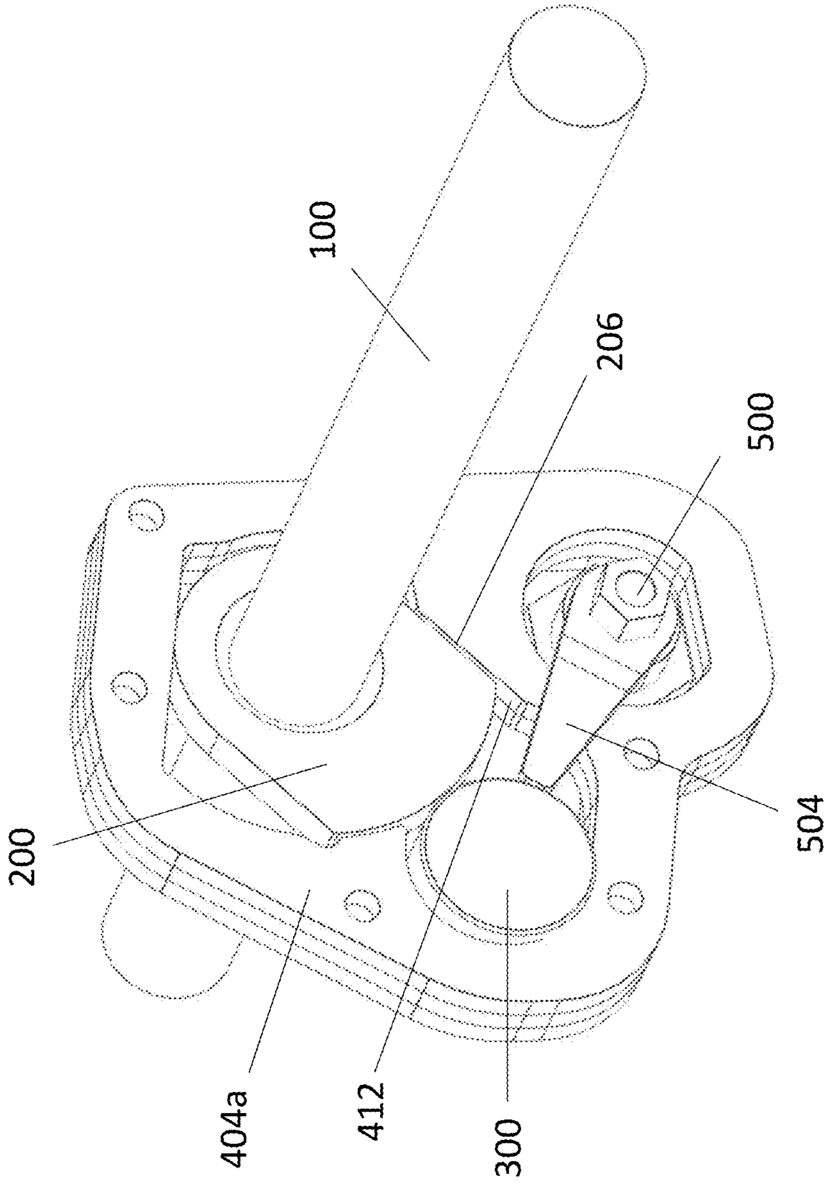
FIG. 10 is a right perspective view of the locking mechanism with the lever pushing the rolling member to the top of the cavity and the cam rotated (outer and first framing plates removed)

The rolling member 300 may be in the form of a cylinder, preferably made of a metal or a hard polymeric material, as best shown in FIG. 5. Alternatively, the rolling member 300 may be in the form of a ball, preferably made of a metal or a hard polymeric material, capable of rolling within the cavity 302 below the cam 200. It will be appreciated that the diameter D of the rolling member 300 is the same as or slightly smaller than the width $W_C$ of the cavity 302 (see FIG. 6), such that the rolling member 300 can roll freely within the cavity 302. Preferably, diameter D is no more than about 0.5 mm less than width $W_C$. As explained below, when the rolling member 300 is located at the bottom of the cavity 302, it blocks the cam 200, and thus the shaft 100, from rotating downwardly (as shown in FIGS. 6-7) (the blocked position); and when the rolling member 300 is located at the top of the cavity 302, the cam 200, and thus shaft 100, may freely rotate downwardly (as shown in FIG. 8-10) (the release position).

As best shown in FIGS. 5 and 11-13, the housing 104 is preferably made up of several flat plates, preferably made of steel, which are assembled to form the housing 104. The plates may be assembled together with mechanical fasteners, such as rivets, bolts/nuts, or screws, without requiring welds. The plates include an outer plate 400, framing plates **402*a* and 402*b*, and rolling plates 404*a* and 404*b*. The outer plate 400 is the outermost plate farthest from the left side bracket 1021, as best shown in FIG. 5. The left side bracket 1021 covers the housing 104 and provides an inner covering plate for the housing 104. As used herein, "inner," "inner side," or the like refers to the side of the locking device that is closest to the left side bracket 1021; and "outer," "outer side," or the like refers to the side of the locking device 10 that is farthest from the left side bracket 1021. Between the left side bracket 1021 and the outer plate 400, from outside in, are the first framing plate 402*a*, the first rolling plate 404*a*, the second rolling plates 404*b*, and the second framing plate 402*b*. Thus, the rolling plates 404*a* and 404*b* are located at the center and adjacent to each other; the first rolling plate 404*a* is adjacent to the first framing plate 402*a*; the first framing plate 402*a* is adjacent to the outer plate 400; the second rolling plate 404*b* is adjacent to the second framing plate 402*b*; and the second framing plate 402*b* is adjacent to the left side bracket 1021. Because the framing plates 402*a* and 402*b* are mirror images of each other, only one plate will be discussed in detail below. The same is also true of the rolling plates 404*a* and 404*b***.

Figure 11:
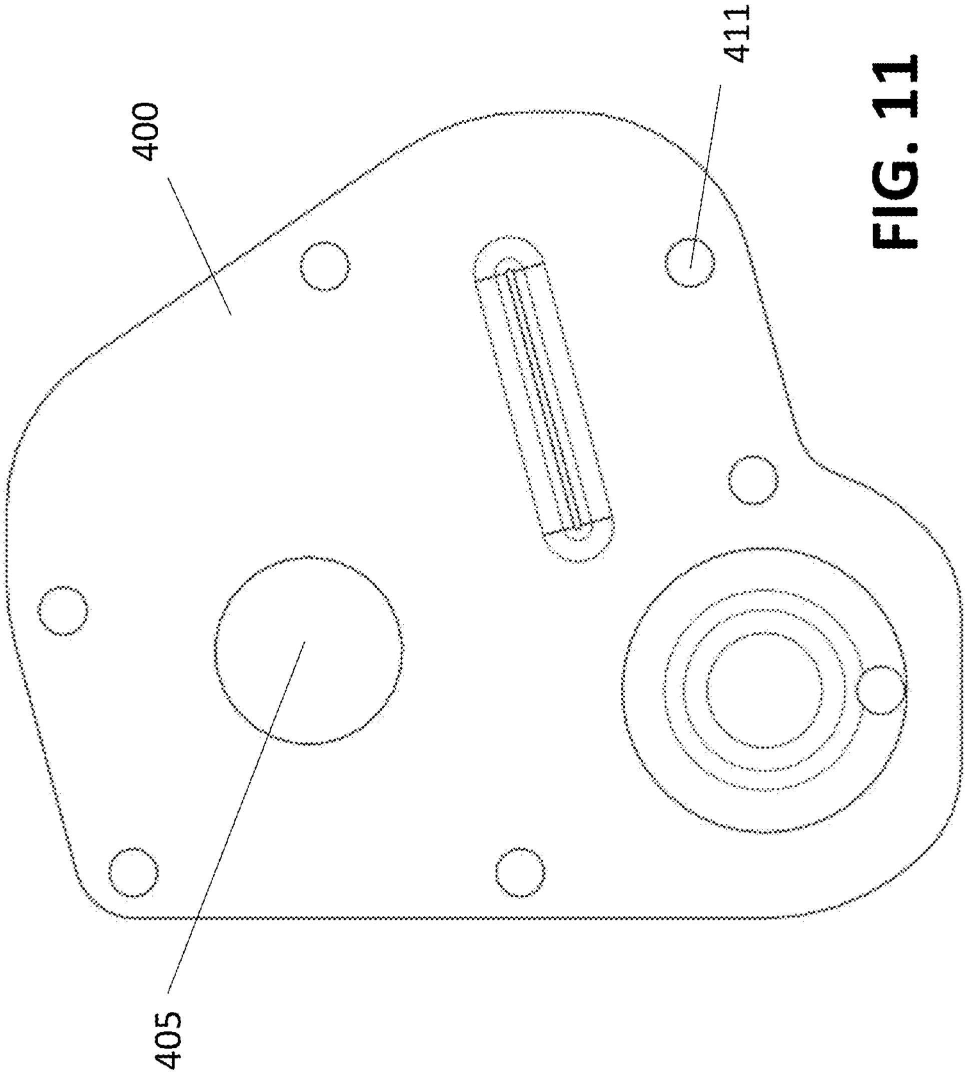
FIG. 11 is a side view of the outer plate.
Figure 12:
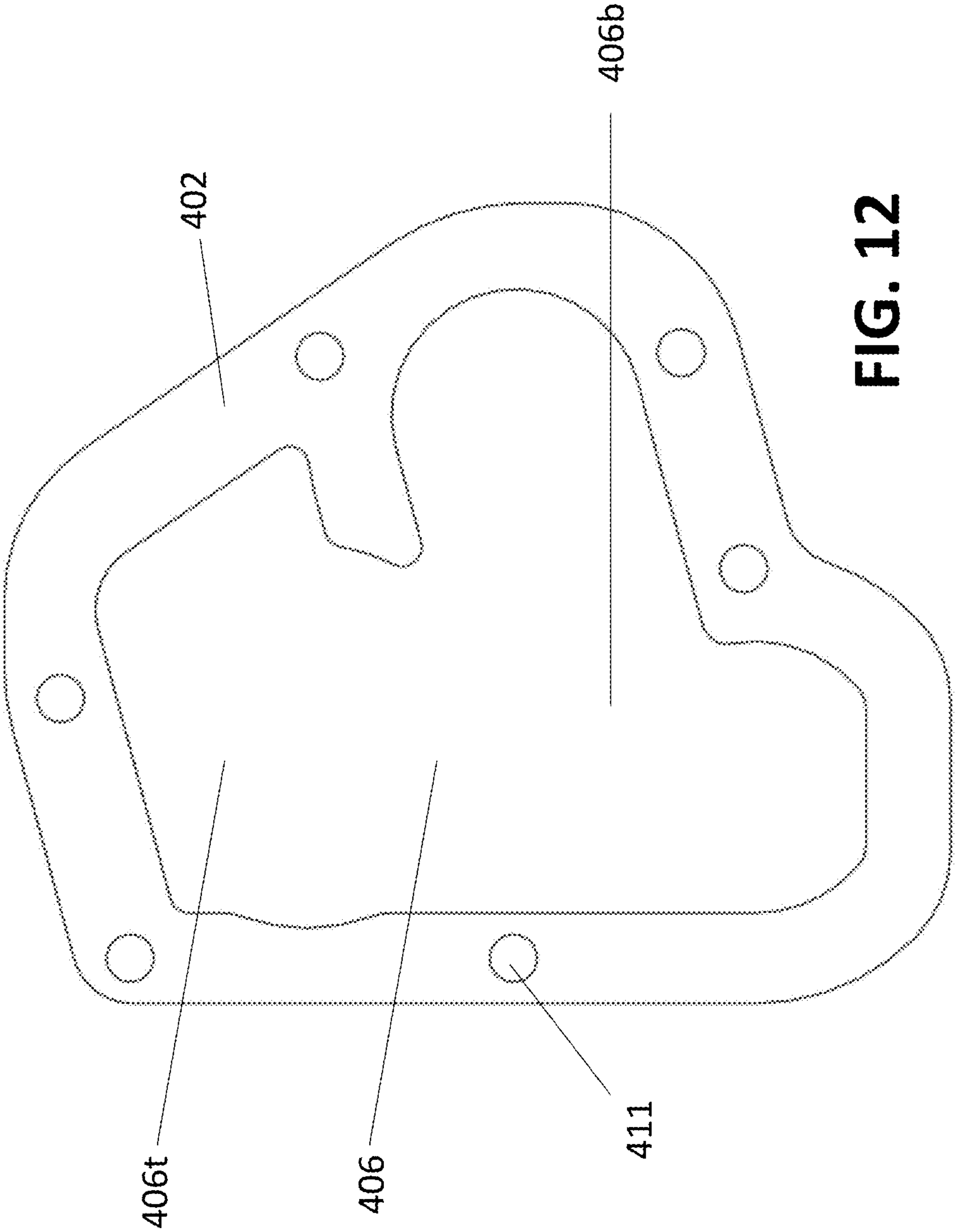
FIG. 12 is a side view of the framing plate.
Figure 13:
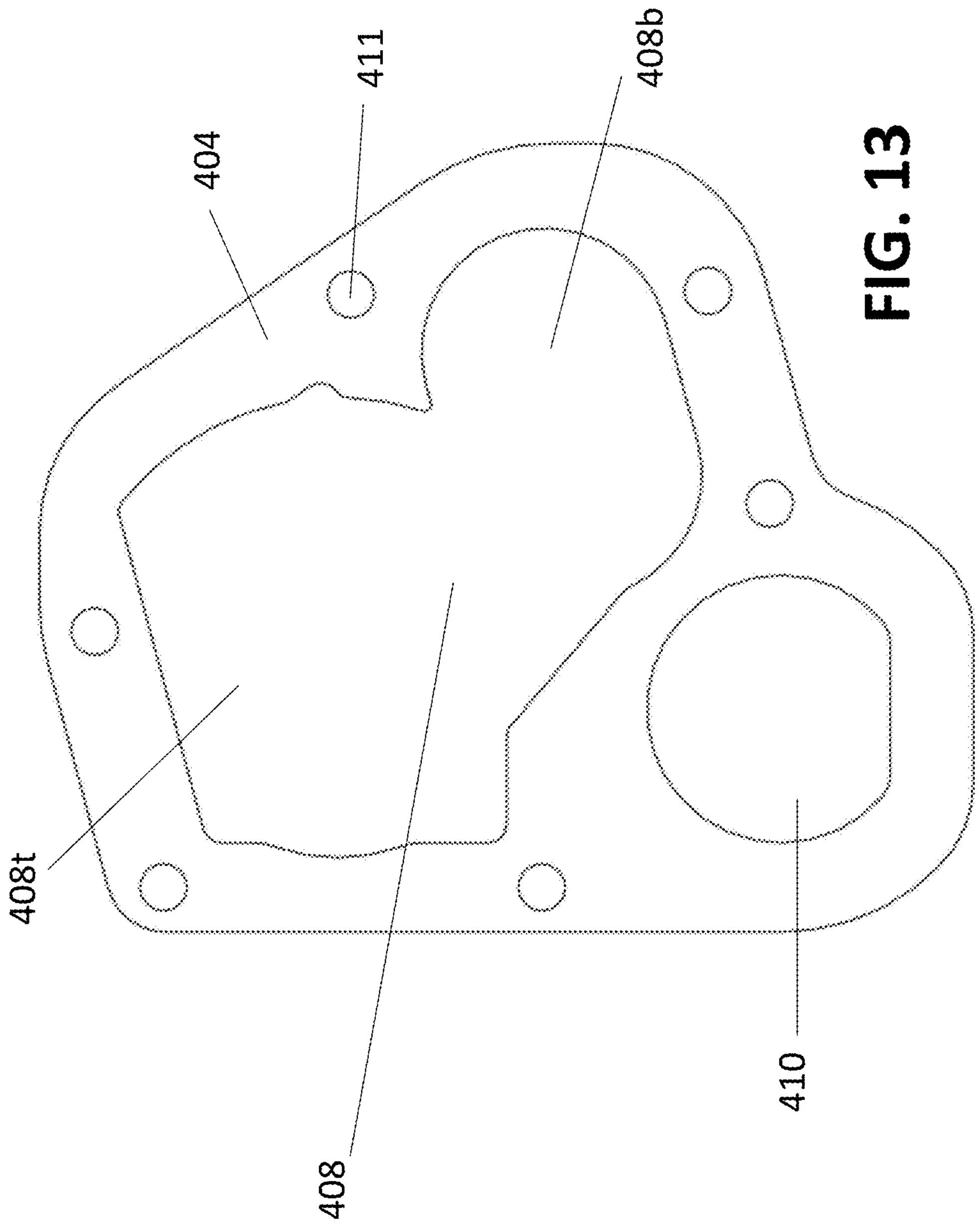
FIG. 13 is a side view of the rolling plate.

As best shown in FIGS. 5 and 11, the outer plate 400 is the outermost plate covering the housing 104. The outer plate 400 has a hole 405 so that the shaft 100 can pass therethrough. As best shown in FIGS. 5 and 12, the framing plate 402 has a hollow center 406 with a top portion **406*t* and a bottom portion 406*b* separated by a narrow neck portion, and frames the perimeter of the housing 104. As best shown in FIGS. 5 and 13, the rolling plate 404 also frames the perimeter of the housing 104, but in addition to a large hollow center 408, the rolling plate 404 also may contain an opening 410 for accommodating a manual release mechanism discussed below. The hollow center 408 of the rolling plate 404 also forms a top portion 408*t* and a bottom portion 408*b* separated by a narrowed neck portion. When the plates are assembled, the top portions 406*t* of the framing plates 402 and 408*t* of the rolling plates 404 align to accommodate the shaft; and the bottom portions 406*b* and 408*b* form the cavity 302 to accommodate the rolling member 300**.

The plates of the housing 104 preferably have matching assembly holes 411 distributed around their perimeters. To assemble the housing 104, mechanical fasteners, such as rivets, bolts/nuts, or screws, are placed through the assembly holes 411 to hold the plates together. Because the housing 104 is mounted to the left side bracket 1021, the left side bracket 1021 also contains matching assembly holes 411 for mounting the housing 104 thereto.

The locking mechanism preferably includes a manual release mechanism for manually opening the locking device 10. As noted above, in the upright position, the rolling member 300 sits at the bottom of the of the cavity 302 (the blocked position) to block the cam 200, and thus the shaft 100, from rotating downwardly (as shown in FIGS. 6-7). The manual release mechanism allows the user to manually push the rolling member 300 to the top of the of the cavity 302 (the release position) to allow the cam 200 to rotate downwardly (as shown in FIG. 10).

As best shown in FIGS. 5-7 and 9-10, the manual release mechanism includes a key cylinder 500 having a lever 504 connected to one end of the key cylinder 500 and extending perpendicularly from the key cylinder 500. The key cylinder 500 is housed in a cylinder housing 506 that is fixed to the left side bracket 1021, such that a keyhole 508 is exposed on the left side bracket 1021. The key cylinder 500 cannot be rotated with respect to the cylinder housing 506 unless a key (not shown) is inserted in the keyhole 508. The key cylinder 500 cannot rotate with respect to the cylinder housing 506 until the key is inserted into the keyhole 508. The key allows for manual access of the container 2 only by authorized persons. The lever 504 is positioned on an end portion of the key cylinder 500 opposite the keyhole 508. The lever 504 is fixed to and extends approximately perpendicularly from the key cylinder 500.

As illustrated in FIGS. 7 and 9, rotation of the key cylinder 500, through use of a key, also rotates the lever 504 (counterclockwise as illustrated in FIGS. 7 and 9). The lever 504 is shaped and configured so that its rotation pushes the rolling member 300 to its release position (see FIG. 9). In the release position, the cam 300 is no longer blocked by the rolling member 300 and is free to turn downwardly (see FIG. 10), thereby allowing the shaft 100 to rotate on its center axis.

Preferably, the rolling plate 404 is configured with a stop surface 412 that is designed to prevent over rotation of the cam 200 (see FIG. 10). The stop surface 412 prevents further rotation of the cam 200, when the side edge 206 of the cam 200 comes in contact with the stop surface 412. The sliding member lever 504 and the cam 200 operate in parallel planes, such that they independently interact with the rolling member 300 without interfering with each other. Preferably, the lever 504 rotates in the same plane as the first framing plate 402*a*, while the cam 200 rotates in the same plane as the first and second rolling plates 404*a* and 404*b*. That way, the lever 504 and the cam 200 can move freely past each other without interference. Although the key cylinder 300 is disclosed as a preferred embodiment for the manual release, a skilled person would recognize that other mechanisms for rotating the lever 504 may suffice as the manual release mechanism.

When the locking device 10 is attached to the front wall 3*a* of the container 2 and the container 2 is in its upright position, the rolling member 300, due to gravity, rests on the stop surface 412 at the bottom of the cavity 302 (see FIGS. 6-7). When the rolling member 202 is in that blocking position at the bottom of the cavity 302, the locking bar 6 cannot be rotated forwardly away from the lid 4 to the opened position, because the rolling member 300 abuts the cam 200 to prevent the cam 200 and thereby the shaft from rotating. To manually open the container, a key may be inserted into the keyhole 508 to turn the key cylinder 500, which in turn rotates the lever 504 forwardly. Although the drawings show a keyhole fitting a cylinder key, a skilled person in the art would recognize that other keyhole/key combinations may be used for the locking device 10. The rotation of the lever 504 pushes the rolling member 300 to the top of the cavity 302 (see FIG. 9). In that position, the rolling member 300 no long blocks the rotation of the cam 200, thereby, allowing the cam 200, and thereby the shaft 100, to be rotated downwardly (see FIG. 10). Rotation of the shaft also rotates the locking bar 6 forwardly away from the lid 4 to the opened position (see FIG. 2).

When it is desirable to empty the contents of the container 2, the container 2 may be grabbed by a lifting mechanism, e.g., of a waste collection truck (not shown), and moved from the upright position to the tilted or dumping position. When in the upright position, the rolling member 300 is in the blocking position (as shown in FIGS. 6-7). Accordingly, the locking bar 6 is prevented from pivoting to its open position (as noted above). However, when the waste container 2 is tipped forwardly, gravity pulls the rolling member 300 from the blocking position (shown in FIG. 6-7) to the release position (shown in FIG. 8). In the release position, the rolling member 300 no longer obstructs the rotation of the cam 200. Consequently, the locking bar 6 may pivot by gravity from the closed position to the open position. The lid 4 of the waste container 2 may then swing open by gravity, permitting the contents of the waste container 2 to be emptied. As the container 2 is returned to its upright position, the locking bar 6 is pulled to its closed position by gravity. When the container 2 is in its upright position, gravity pulls the rolling member 300 back to its blocking position (FIGS. 6-7).

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A locking device with a housing having a cavity therein, the cavity houses a locking mechanism, the locking mechanism comprising:

a. a shaft protruding through the housing and rotatable around a central axis of the shaft;

b. a cam fixed to a perimeter of the shaft;

c. a locking bar extending from and non-rotatably connected to the shaft; and d. a rolling member disposed in a slot within the housing, wherein when the rolling member is located at a first end of the slot, the rolling member abuts the cam and blocks the cam from rotating, thereby blocking the shaft from rotating to an open position, wherein when the rolling member is located at a second end of the slot, the rolling member is remote from the cam to allow the shaft to rotate to the open position.

2. The locking device of claim 1, wherein when the locking device is in an upright position, the slot is angled relative to the horizontal at an angle of 30 to 60°.

3. The locking device of claim 1, wherein the rolling member is a cylinder or a ball.

4. The locking device of claim 1, wherein a diameter of the rolling member is less than a width of the slot.

5. The locking device of claim 1, wherein the locking mechanism further comprises a manual release mechanism configured to manually move the rolling member to the second end of the slot.

6. The locking device of claim 5, wherein the manual release mechanism comprises a key cylinder and a lever fixed to one end of the key cylinder, the lever extends perpendicularly from the key cylinder, rotation of the key cylinder causes rotation the lever to push the rolling member to the release position.

7. The locking device of claim 1, wherein the housing comprises a plurality of flat plates fixed together.

8. The locking device of claim 7, wherein the plates include framing plates, rolling plates adjacent to each other and sandwiched between the framing plates, and an outer plate covering one of the framing plates.

9. The locking device of claim 7, wherein the plates are secured together with mechanical fasteners.

10. The locking device of claim 1, wherein the cam is a U-shaped plate.

11. The locking device of claim 10, wherein the U-shaped plate comprises a broad end and a rounded end, the rounded end being proximate to the shaft such that the distance between the shaft and the broad end is greater than the distance between the shaft and the rounded end.

12. The locking device of claim 1, wherein when the rolling member is located at the first end of the slot, a side edge of the cam abuts the rolling member.

13. The locking device of claim 1, further comprising a left side bracket and a right side bracket, the shaft protrudes through both the left and right side brackets, and the housing is attached to one of the left and right side brackets.

14. The locking device of claim 13, the left and right side brackets are configured to be secured to a container.

15. The locking device of claim 13, wherein the left and right side brackets are spaced apart with the housing positioned therebetween.

16. The locking device of claim 1, wherein the locking bar extends parallel to the shaft.

17. The locking device of claim 1, wherein the locking bar is connected to the shaft by at least one L-shaped arms.

18. A container assembly, comprising:
a. a container body;
b. a hinged lid pivotally mounted to the body; and
e. the locking device of claim 1 mounted to a front wall of the container body.

19. A method for making a container assembly, comprising the steps of:
a. providing a container having a container body and a hinged lid pivotally mounted to the body; and
b. mounting the locking device of claim 1 to a front wall of the container body.

20. A method for dumping a container, comprising:
a. providing the container of claim 18; and
b. rotating the container forwardly toward the front wall, wherein the rotation causes the rolling member to roll to the first end of the slot for thereby allowing gravity to pull the locking bar into the open position to allow the lid to be pivoted away from the container body by gravity.

* * * * *